US011874478B1

(12) United States Patent
Mudge

(10) Patent No.: US 11,874,478 B1
(45) Date of Patent: Jan. 16, 2024

(54) RANGE CORRECTING RADIOMETRIC LENS, METHOD OF OPTICAL DESIGN, AND RANGE FINDING SYSTEM USING SAME

(71) Applicant: Golden Gate Light Optimization LLC, San Francisco, CA (US)

(72) Inventor: Jason D Mudge, San Francisco, CA (US)

(73) Assignee: Golden Gate Light Optimization LLC, San Francisco, CA (US)

( * ) Notice: Subject to any disclaimer, the term of this patent is extended or adjusted under 35 U.S.C. 154(b) by 382 days.

(21) Appl. No.: 16/990,939

(22) Filed: Aug. 11, 2020

Related U.S. Application Data

(60) Provisional application No. 63/048,548, filed on Jul. 6, 2020.

(51) Int. Cl.
| | |
|---|---|
| *G02B 3/08* | (2006.01) |
| *G02B 3/04* | (2006.01) |
| *G02B 3/00* | (2006.01) |
| *G01S 17/08* | (2006.01) |
| *G02B 19/00* | (2006.01) |
| *G01C 3/02* | (2006.01) |
| *G02B 1/00* | (2006.01) |

(52) U.S. Cl.
CPC ............ *G02B 3/08* (2013.01); *G01C 3/02* (2013.01); *G01S 17/08* (2013.01); *G02B 1/002* (2013.01); *G02B 3/0087* (2013.01); *G02B 3/04* (2013.01); *G02B 19/0014* (2013.01); *G02B 19/0023* (2013.01)

(58) Field of Classification Search
CPC ........ G02B 3/08; G02B 1/002; G02B 3/0087; G02B 3/04; G02B 19/0014; G02B 19/0023
See application file for complete search history.

(56) References Cited

U.S. PATENT DOCUMENTS

| 3,873,408 A | 3/1975 | Hensler |
| 5,198,657 A | 3/1993 | Trost et al. |
(Continued)

OTHER PUBLICATIONS

Chieh-Jen Cheng and Jyh-Long Chern, "Quasi Bessel beam by Billet's Split N-lenses," Optics Communications v. 283 iss. 24, Dec. 2010.

(Continued)

*Primary Examiner* — Georgia Y Epps
*Assistant Examiner* — Don J Williams
(74) *Attorney, Agent, or Firm* — Johnathan W Brownlee

(57) ABSTRACT

The present invention is directed to a light gathering lens that instantaneously corrects for the effect of varying distance between an object and a sensor such as a range finding sensor or LiDAR. Methods of designing these lenses using both traditional lenses and exotic metamaterials and gradient index materials are disclosed, as well as methods of optimizing a design for a given detector type and application. Range-finding systems using these lenses in practice to optically correct for radiometric variation of returned signals received from an object of varying distances are further disclosed. Lenses and range-finding systems suitable for use in a variety of electromagnetic wavelength ranges are disclosed including but not limited to visible, infrared, and millimeter wave regimes.

20 Claims, 10 Drawing Sheets

(56) References Cited

U.S. PATENT DOCUMENTS

| | | | | |
|---|---|---|---|---|
| 5,202,567 | A * | 4/1993 | Hamanaka | G02B 6/43 250/208.2 |
| 2011/0096416 | A1* | 4/2011 | Obama | G02B 9/06 359/793 |
| 2012/0075594 | A1* | 3/2012 | Tsai | G03B 21/208 353/38 |
| 2020/0014467 | A1* | 1/2020 | Tan | G02B 3/08 |
| 2020/0361165 | A1* | 11/2020 | Wu | C03C 23/0025 |
| 2021/0080763 | A1* | 3/2021 | Sulai | G02B 5/3041 |

OTHER PUBLICATIONS

Max Born and Emil Wolf, "Principles of Optics 7th Edition," Cambridge Press, 2002.

Jason Mudge, "Designing an incoherent optical detection sensor (LiDAR) utilizing a range compensating lens." Applied Optics, v.59, n.20, pp. 6076-6084, Jul. 8, 2020.

Jason Mudge, "Specular return through a range-compensating lens." Applied Optics, v.59, n. 12 pp. 3568-3574, Apr. 15, 2020.

Adam Phenis and Jason Mudge, "A variety of range compensating lens designs for active optical systems." Proc. of SPIE Ind. Optical Devices & Systems, v.11125 Aug. 20, 2019.

Jason Mudge, "Range-compensating lens for non-imagine active optical systems," Applied Optics, v.58 n.28 pp. 7921-7927, Oct. 1, 2019.

John E. Greivenkamp, "Field Guide to Geometric Optics," SPIE Press vol. FG01 of SPIE Field Guides, 2004.

James M. Palmer and Barbara G. Grant, "The Art of Radiometry," SPIE Press 2009.

Robert Fiete, "Modeling the Imaging Chain of Digital Cameras," SPIE Press 2010.

John B. Pendry, "Negative refraction makes a perfect lens," Phys. Rev. Lett. v.85 n.18, pp. 3966-3969, Oct. 30, 2000.

Coffre, Vargas et al, "Dual polarization split lenses," Optics Express v. 25 n. 20, Oct. 2017.

* cited by examiner

US 11,874,478 B1

RANGE CORRECTING RADIOMETRIC LENS, METHOD OF OPTICAL DESIGN, AND RANGE FINDING SYSTEM USING SAME

CROSS-REFERENCE TO RELATED APPLICATIONS

This application claims the benefit of priority to U.S. Provisional Patent Application Ser. 63/048,548 entitled "Range Correcting Radiometric Lens, Method of optical Design, and Range Finding System Using Same" filed Jul. 6, 2020. The entire contents of the above identified priority document is hereby incorporated herein by reference.

TECHNICAL FIELD

The present invention is in the technical field of electromagnetic radiation collection and sensing, and in particular in active optical systems where the range to the object may vary so sensitive detectors with high dynamic range are necessary.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

COPYRIGHT AND TRADEMARKS

A portion of the disclosure of this patent document may contains material that is subject to copyright or trademark protection by the inventor. The inventor has no objection to the facsimile reproduction by anyone of the patent document or the patent disclosure, as it appears in the Patent and Trademark Office patent files or records, but otherwise reserves all copyright rights whatsoever. Trademarks such as product or brand names so registered at the Trademark Office or otherwise protected by law and owned by another are used herein only as helpful illustrations and are not indicative of any endorsement or claim of utility by the inventor or said third party mark holders.

BACKGROUND OF THE INVENTION

Unless otherwise indicated herein, the materials described in this section are not prior art to the claims in this application and are not admitted to be prior art by inclusion in this section.

Active optical systems are highly useful tools for sensing the qualities and locations of objects by sending out light and then measuring the returned light reflected by targets. In particular, many of these systems are mono-static, in that the light is sent out and returned to a sensor that are co-located at the same place relative to an object of interest. One significant limiting factor in the performance of these systems is the high dynamic range required in the receiving side of an active optical system, as the returned signal falls off greatly as distances increase to the object being measured. Thus, when objects are close to the system the returned signal can be very high, but at longer ranges can fall off to vanishingly small levels. So great is this dynamic range requirement that sensitive detectors such as avalanche diodes or photomultipliers are needed to sense the return at long range, yet those same detectors can be blinded or damaged by much higher return signal strengths at short range. Often designs must be constrained in the source, collecting optics and detector based on the longest expected range. This can expose sensitive detectors to risk of damage or destruction should a close object create a high signal return that overwhelms the receiving side of the system.

To date solutions to this problem have been suggested, and largely fall into two broad categories: throttling the source dynamically, or adjusting the gain on the detector in response to a measured return signal strength. Unfortunately, both of these methods require active response and monitoring, and cannot be achieved instantaneously; the risk of detector saturation or damage persists especially in the case of fast moving objects or rapidly changing environments in which the active optical system is operating.

Other methods of correcting for this vast difference in received power over a range of distances have been suggested in the art over many years, and thus far require some form of active receiver-side control to avoid detector damage.

Systems which rely on these active sensor systems include LiDAR, range finding systems across many wavelengths, and enable applications from remote sensing in spacecraft operation to self-driving vehicles. These applications, however, operate across a range of distances between the sensor system and the object of interest often orders of magnitude apart; a self-driving car has as much need to see another vehicle in traffic at a distance less than one meter as it might a dead-end of a road sign over a kilometer away. In another example a consumer range finder used in hunting or sports may need to operate over many orders of magnitude of range from the rangefinder itself, maintaining performance over a wide gamut of distances. Finally, actively controlled receive-side power as has been used to date requires either complex feedback electronics, potentially delicate moving parts, or both.

If, however, it was possible for the receiver's own collecting optics to instantaneously correct for this fall-off effect, and thus prevent potential damage to sensitive and expensive detectors, no active electronic or optical control would be necessary. Moreover, complex protective circuitry and feedback electronics would be eliminated, as would be any potential requirement for moving parts. Solving this complex and pandemic need in active optical systems is the primary objective of the present invention.

SUMMARY OF THE INVENTION

The primary objective of the present invention is to provide an instantaneously correcting lens that can moderate the returned signal in an active optical system where the range to the object being studied may vary, thus varying the return signal strength impinging on a detector. In particular, systems using active optical sensing such as LiDAR imaging and range finding systems benefit from examples of the invention disclosed herein.

In many active optical systems, object distances can be large requiring sensitive detectors that record the very small returned signal from a transmitted source of optical power. Avalanche diodes, photomultipliers and other sensitive optoelectronics are used that if exposed to power above an upper threshold can saturate, temporarily blind or utterly destroy these delicate detectors. Although rapid electronic control of detector gain can sense input power above the threshold of saturation or damage, it is not instantaneous, and complicates the system design. Rather than attempt to actively control the electronic gain of the detector, the present invention uses a novel lens design to compensate instantaneously for increases in power caused by decreases in object distance from the active optical system.

More specifically, the novel lenses, methods of designing them, and systems that use them in an active optical application can compensate for the radiometric losses (e.g. the 'one-over-distance-squared' factor) in a radiometer system by using a plurality of optical materials and/or surfaces to controllably defocus the power impinging on the detector area at closer and closer ranges from the object of interest. This range-compensating lens causes light refracted by a plurality of optical elements to be controllably defocused at closer ranges, thus decreasing the power density on the detector at close range. When an object is at greater range and collected power would nominally be lower, more of the overall lens' aperture is focused on to a smaller active area of the detector, thus increasing power density compared with a simple lens case. In the simplest of cases, a pair of lenses are combined and aligned axially so that an inner lens with a high focal ratio is preferentially gathering light at a near object distance, while an outer lens with a lower focal ratio gathers more power across the combined input pupil. Thus, at close distances, the combined lens is effectively defocused so the power density at the detector is lowered, where at longer distances more of the power collected at the input aperture is focused at the detector increasing power density relative to any simple lens.

Additionally, where simple lenses are useful in understanding the examples of the invention, this technique and the design methodology developed herein are not limited to curved glass surfaces and visible or NIR wavelengths. Specifically, combinations of gradient index materials could be formed that enable this compensating lens to be formed without curved optical surfaces at all. Moreover, at some designated wavelengths combinations of exotic metamaterials with bespoke or even negative indices of refraction can be used to form the combination of elements described in this disclosure and form a perfect compensating lens, even at millimeter wavelengths and beyond as described in the simple lens case by J. Pendry in Physical Review Letters. 85 (18): 3966-3969. High powered sources of millimeter wavelength illumination exist such as gyrotrons capable of generating watts of this light over great distances, making them useful even in light of their higher atmospheric attenuation. Suitable detectors, such as avalanche diodes coupled to suitable receivers for mm-wavelengths are also readily available to use in these designated wavelengths as desired.

Where throughout this disclosure the term "optical" is frequently used for convenience, it should be understood that the term is not limited to any single wavelength of electromagnetic radiation, nor is it limited to visible, near-infrared, or thermal infrared wavelengths. Longer wavelength regimes such as millimeter wave or microwaves are specifically included in the use of the term "optical" inasmuch as they are all electromagnetic radiation and exhibit behavior conducive to the application of the present invention and its examples described below. Similarly, "light" can be understood as not being limited to optical radiation alone but any frequency regime where the invention as described is functional.

Additionally, throughout this disclosure the term "lens" is frequently used for convenience, though it should be understood the term is not limited to simple curved glass lenses in the visual (visible) or near-IR ("VNIR") regime, but to any object capable of concentrating EM radiation as it is transmitted through that object, such as "perfect lenses" crafted from meta-materials, or gradient-index materials that may also operate outside the VNIR regime as well. Often multiple individual simpler lenses are combined together with mounting members holding them in a desired configuration to form a more complex lens assembly that has properties different from any single lens element might exhibit. Lenses in this sense could be a singlet lens of one optical material such as a glass, or a multielement lens such as an achromatic doublet or triplet (e.g. "Cooke triplet,") as well as a lens operating under diffractive effects such as a Fresnel, or more complex diffractive optical element ("DOE.") Finally, a lens could have an aspheric optical figure, or a freeform figure not readily approximated by a simple geometric expansion such as aspheric coefficients or spherical surface figure specifications; similarly a lens might have a very high optical power (high focusing power also expressed as a low F/#) or a negligible optical power approximating an optical flat as determined using the designs and methods herein. Range finding systems using a combination of optical elements in a lens array (a.k.a the 'range compensating lens') along with sources of light, detector systems, and signal processors capable of using some signal from the detector system to compute a range to an object or target are also illustrated, with many combinations of individual lenses, mounting members, detectors and necessary signal and computational processing elements combined to provide for a range-compensating active system useful for computing ranges to a given spot in object space, and thus generating as in LiDAR a 3D image of a scene.

To further clarify, the term "optical power" is used throughout this disclosure as is often used by one skilled in the art to mean, depending on context, either the light-bending power of a surface in an optical element or lens, as well as the radiometric power in Watts contained within an electromagnetic field. Irradiance is also used, as a measurement of radiometric power per unit area (e.g. $W/m^2$.) Optical power in the context of focusing or diverging power is clearly differentiated by dimensional analysis in addition to context, having units of inverse length (e.g. $mm^{-1}$) and one of skill in the art will find no ambiguity in this differentiation. An excellent discussion of optical power in the context of a lens can be found in Greivenkamp's "Field Guide to Geometrical Optics" on page 7, similarly a discussion of radiometric optical power can be found differentiated in the same guide on page 84-88 as pertaining to flux $\Phi$ as radiometric power measured in Watts.

These and other aspects of the invention will become apparent from the following description of the examples taken in conjunction with the following drawings. As would be obvious to one skilled in the art, many variations and modifications of the invention may be affected without departing from the spirit and scope of the novel concepts of the disclosure.

Figure 1:
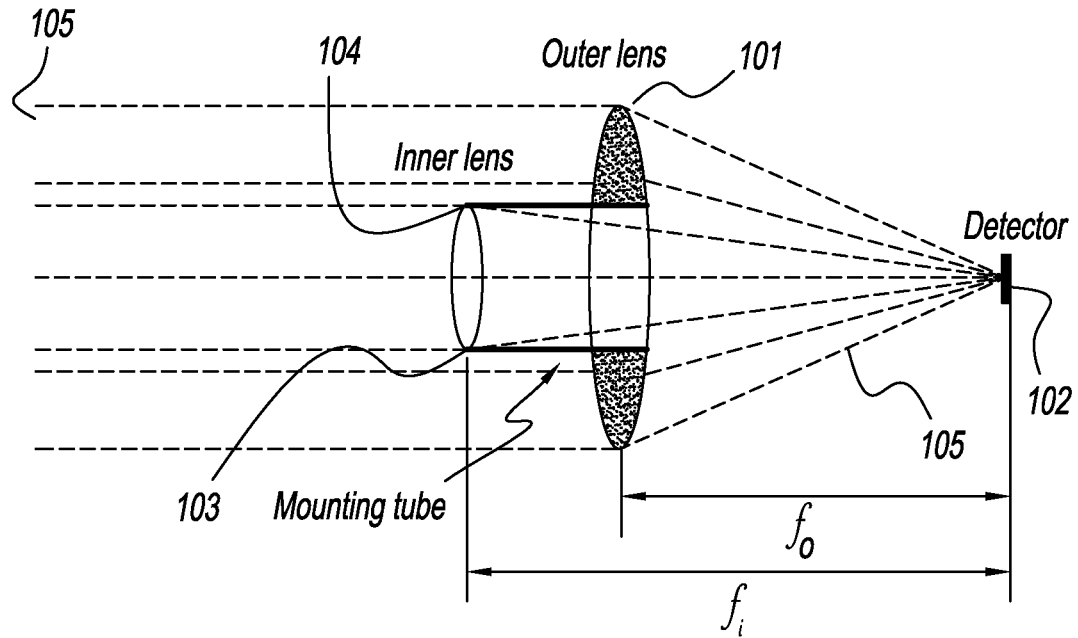
FIG. 1 is a cross-sectional view of a range compensated lens in accordance with an example of the invention where an inner lens and outer lens of differing focal ratios or f-numbers are combined with a mounting tube to achieve a desired degree of defocus with changing object distance.

of the design space available to the present invention. While in these examples we restrict ourselves to first-order ray optics, it would be obvious to one of ordinary skill that adding third or higher order aberrations to consideration would be a matter of including those higher order terms as needed from the series expansion representing wavefront error. Our restriction to first-order optics herein is in no sense limiting, and serves only to clarify the design method and simplifications possible in the design of these lenses considering only their instant radiometric characteristics. Finally, we apply a series of reasonable approximations to simplify the design process and create an intelligible series of relationships that can be used to rapidly optimize these new range compensating lenses.

In purest form, the present invention includes a design methodology for quickly optimizing range compensating lenses given some input specifications for the finished system. Careful and judicious choice of the lens prescriptions, spacing and detector size allow the solid conical angle $\Omega$ as a function of range z to be specified, controlling that variable such that over a long range the solid angle subtended by the detector through the optics into object space creates as consistent a flux $\Phi$ in the familiar radiative transfer relation $\Phi=LA\Omega$ as is well known in the art. Additionally, we introduce the concept in several cases of an effective collection area for a lens radiometrically, such that in some cases it is helpful to think of a filter or coating on a lens in the designs to reduce the physical area an individual lens might "de-rate" or reduce the otherwise clear collection area of that same lens within a multiple lens assembly at a designated wavelength of interest during design.

The underlying radiometric effects the invention seeks to ameliorate must be addressed at first order before any consideration of higher order effects is warranted. We begin by applying a piece-wise composition of the effective solid angle cone subtended by the lenses and detector, using the system by way of non-limiting example illustrated in FIGS. 1, 2, and 3 to begin, although similar methods would work with other types of optical devices such as the GRIN example discussed earlier in FIG. 5. This we begin with $$\Omega'_i(z'_i) = \begin{cases} \frac{\pi}{4}\left(\frac{\sqrt{A_D}}{z'_i - f_i}\right)^2 & \text{for } z'_i > \frac{f_i}{1 - \frac{\sqrt{A_D}}{D_i}} \\ \frac{\pi}{4}\left(\frac{D_i}{z'_i}\right)^2 & \text{for } z'_i \leq \frac{f_i}{1 - \frac{\sqrt{A_D}}{D_i}} \end{cases} \quad (1)$$

$$\Omega'_o(z'_o) = \begin{cases} 0 & \text{for } z'_o > \frac{f_o}{1 - \frac{\sqrt{A_D}}{D_i + 2t}} \\ \frac{\pi}{4}\left(\left(\frac{\sqrt{A_D}}{z'_o - f_o}\right)^2 - \left(\frac{D_i + 2t}{z'_o}\right)^2\right) & \text{for } \frac{f_o}{1 - \frac{\sqrt{A_D}}{D_i + 2t}} \geq z'_o > \frac{f_o}{1 - \frac{\sqrt{A_D}}{D_o}} \\ \frac{\pi}{4}\left(\left(\frac{D_o}{z'_o}\right)^2 - \left(\frac{D_i + 2t}{z'_o}\right)^2\right) & \text{for } z'_o \leq \frac{f_o}{1 - \frac{\sqrt{A_D}}{D_o}} \end{cases} \quad (2)$$

Improved Design Method for Compensating Lenses

Although throughout this disclosure several different design methodologies could be used as is known in the art, here we explore a method constrained to first-order Gaussian optics that provides a facile and enlightening understanding As can be seen above in Eq. 2 the solid angle of the hole in the outer lens is subtracted from the solid angle of the outer lens with no hole giving the effective solid angle of the outer lens with the hole in it. In the very short range that is represented by the first equation in Eq. 1 and 2, the detector collects a portion of the light from the inner lens and does not collect any light from the outer lens. This light from the outer lens bypasses the detector's active area at these short ranges. As the range increases, light collected by the detector from the outer lens increases.

$$A\Omega = (m_i^2 A)\Omega'_i(z'_i) + (m_o^2 A)\Omega'_o(z'_o) \quad (3)$$

where $m_i$ and $m_o$ are the magnifications from the inner and outer lens as typically specified respectively, and taught in many lens design texts including John E. Greivenkamp's well-known "Field Guide to Geometric Optics" available from SPIE Press as Vol. FG01. Dividing by the object area gives $$\Omega = m_i^2 \Omega'_i(z'_i) + m_o^2 \Omega'_o(z'_o) \quad (4)$$

as the governing equation to be shaped to compensate for range loss in the return signal on the detector.

$$z'_i = \frac{f_i z}{z - f_i} \quad (5)$$

and $$z'_o = \frac{f_i(z + (f_i - f_o))}{(z + (f_i - f_o)) - f_o}, \quad (6)$$

respectively. Substituting these two equations into Eq. (1), (2), and (4) yields $$\Omega'_i(z) = \begin{cases} \frac{\pi}{4}\left(\frac{\sqrt{A_D}(z-f_i)}{f_i^2}\right)^2 & \text{for } z < \frac{f_i}{\frac{\sqrt{A_D}}{D_i}} \\ \frac{\pi}{4}\left(\frac{D_i(z-f_i)}{f_i z}\right)^2 & \text{for } z \geq \frac{f_i}{\frac{\sqrt{A_D}}{D_i}} \end{cases}, \quad (7)$$

$$\Omega'_o(z) = \quad (8)$$

$$\begin{cases} 0 & \text{for } z < f_o\left(\frac{1}{\frac{\sqrt{A_D}}{D_i+2t}} + 1\right) + f_i \\ \frac{\pi}{4}\left(\left(\frac{\sqrt{A_D}(z+f_i-2f_o)}{f_o^2}\right)^2 - \left(\frac{(D_i+2t)(z+f_i-2f_o)}{f_o(z+f_i-f_o)}\right)^2\right) & \text{for } f_o\left(\frac{1}{\frac{\sqrt{A_D}}{D_i+2t}}+1\right)+f_i \leq z < f_o\left(\frac{1}{\frac{\sqrt{A_D}}{D_o}}+1\right)+f_i \\ \frac{\pi}{4}\left(\left(\frac{D_o(z+f_i-2f_o)}{f_o(z+f_i-f_o)}\right)^2 - \left(\frac{(D_i+2t)(z+f_i-2f_o)}{f_o(z+f_i-f_o)}\right)^2\right) & \text{for } z \geq f_o\left(\frac{1}{\frac{\sqrt{A_D}}{D_o}}+1\right)+f_i \end{cases}$$

and $$\Omega(z) = m_i^2 \Omega'_i(z) + m_o^2 \Omega'_o(z) \quad (9)$$

While a digital computer can in principle handle these equations easily via iteration, they provide very little insight into a design case other than by trial and error. However, if we consider a remote sensing system where $z \gg f_i$, $z \gg f_o$ as taught in Robert D. Feite's treatise "Modeling the Imaging Chain of Digital Cameras" available from SPIE Press since 2010, and that the detector size is much smaller that the lens diameters (to include the mounting tube thickness)

$$1 \gg \frac{\sqrt{A_D}}{D_i + 2t} \text{ and } 1 \gg \frac{\sqrt{A_D}}{D_o},$$

then Eq. 7, 8, and 9 reduce to $$\Omega'_i(z) \approx \begin{cases} \frac{\pi}{4}\left(\frac{\sqrt{A_D}\,z}{f_i^2}\right)^2 & \text{for } z < \frac{f_i}{\frac{\sqrt{A_D}}{D_i}} \\ \frac{\pi}{4}\left(\frac{D_i}{f_i}\right)^2 & \text{for } z \geq \frac{f_i}{\frac{\sqrt{A_D}}{D_i}} \end{cases}, \quad (10)$$

$$\Omega'_o(z) \approx \begin{cases} 0 & \text{for } z < \frac{f_o}{\frac{\sqrt{A_D}}{D_i+2t}} \\ \frac{\pi}{4}\left(\left(\frac{\sqrt{A_D}\,z}{f_o^2}\right)^2 - \left(\frac{D_i+2t}{f_o}\right)^2\right) & \text{for } \frac{f_o}{\frac{\sqrt{A_D}}{D_i+2t}} \leq z < \frac{f_o}{\frac{\sqrt{A_D}}{D_o}}, \\ \frac{\pi}{4}\left(\left(\frac{D_o}{f_o}\right)^2 - \left(\frac{D_i+2t}{f_o}\right)^2\right) & \text{for } z \geq \frac{f_o}{\frac{\sqrt{A_D}}{D_o}} \end{cases} \quad (11)$$

and $$\Omega(z) \approx \left(\frac{f_i}{z}\right)^2 \Omega'_i(z) + \left(\frac{f_o}{z}\right)^2 \Omega'_o(z) \quad (12)$$

where $$m_i^2 \approx \left(\frac{f_i}{z}\right)^2 \text{ and } m_o^2 \approx \left(\frac{f_o}{(z+f_i-f_o)}\right)^2 \approx \left(\frac{f_o}{z}\right)^2$$

as the simplified set of governing equations. For example, it is clear to see the one over range squared fall off for large range domains. Remember the purpose of the lens, the ideal $\Omega(z)$ is to be held constant over range inasmuch as possible; spikes or large swings in solid angle seen by the lens and detector together are to be minimized in exchange for a more predictable nearly horizontal function for $\Omega(z)$. This is a tricky task but is now illuminated by the last three equations in the above simplification. In particular, we find that the system of equations in Eq. 10, 11, and 12 physically relate to range-finding systems although it would be obvious to one skilled in the art that these simplifications produce a more intelligible set of coupled design relationships. It is armed with these design guidelines we shall further develop examples to illustrate the performance of the compensating lens in very short and very long-range system designs. A table of the design parameters in this simplified set of design guides is provided for convenience below, and is particularly of note in context of examples shown in FIGS. 1, 2, 3, and 5:

TABLE 1

Design parameters for constructing a range-compensating lens assembly

Figure 2:
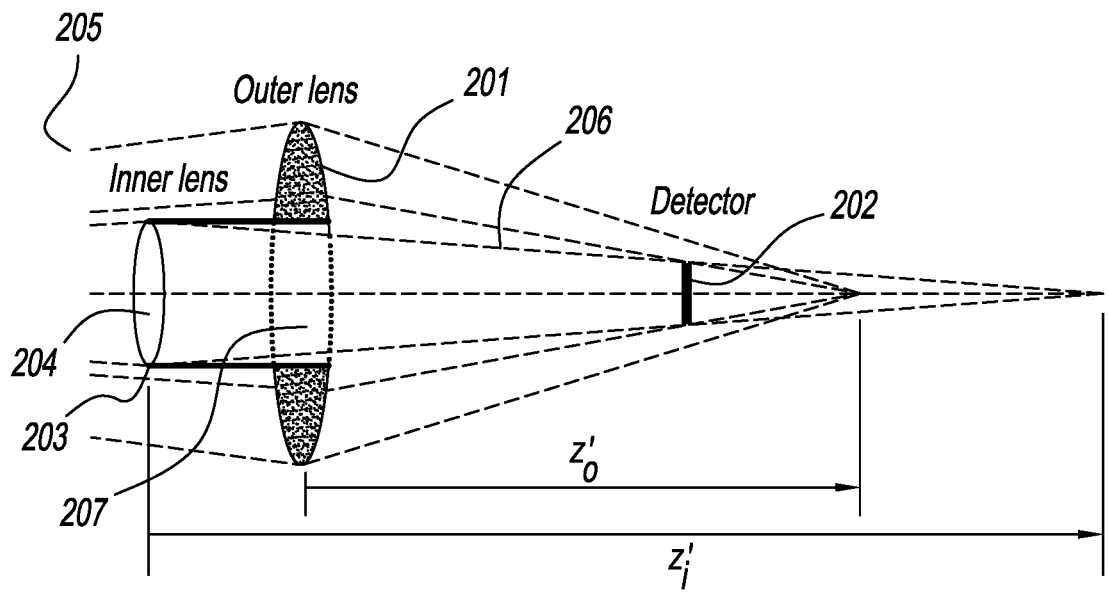
FIG. 2 is a cross-sectional view of the range compensated lens assembly in FIG. 1 wherein the object is closer to the lens and a controlled degree of defocus is applied to protect the detector.
Figure 3:
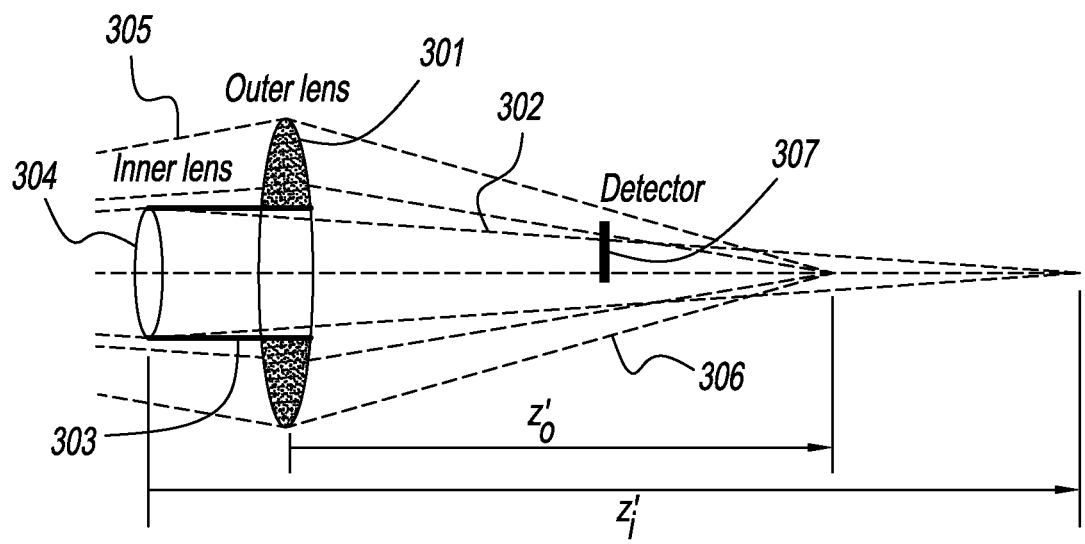
FIG. 3 is a cross sectional view of the range compensated lens assembly in FIG. 1 wherein the detector is shifted up by misalignment into an off-axis position thus decreasing the compensating effect.

| | |
|---|---|
| $f_i$ | Focal length of inner lens (typically in mm) |
| $f_o$ | Focal length of outer lens (typically in mm) |
| $D_i$ | Diameter of the inner lens (mm) |
| $D_o$ | Diameter of outer lens (mm) |
| t | Spacer tube ("mounting member") radial thickness associated in FIG. 1, 2, and 3 between the lenses (mm) |
| $\sqrt{A_D}$ | Characteristic diameter of the detector element (typically in μm) |

To optimize the design this lens there are several constraints applied to yield a 'best effort' first design, but first a benchmark (equivalent) lens is required to compare with the compensated design and determine relative progress in optimization of the range compensating lens thus designed. To do this, an equivalent lens focal length and diameter must be determined. First, an equivalent lens is equated to the range compensated lens in the long range. This is done because the max range typically sets the lens diameter (f-number). Starting with Eq. 10, 11, and 12, applying them in the long range gives $$\left(\frac{f_i}{z}\right)^2 \frac{\pi}{4}\left(\frac{D_i}{f_i}\right)^2 + \left(\frac{f_o}{z}\right)^2 \frac{\pi}{4}\left(\left(\frac{D_o}{f_o}\right)^2 - \left(\frac{D_i + 2t}{f_o}\right)^2\right) \equiv \left(\frac{f_{eq}}{z}\right)^2 \frac{\pi}{4}\left(\frac{D_{eq}}{f_{eq}}\right)^2 \quad (13)$$

where the right hand side of the equation represents the equivalent lens to be determined. After some algebra, an equivalent diameter ($D_{eq}$) is found and is given as $$D_{eq}^2 = D_i^2 + D_o^2 - (D_i + 2t)^2. \quad (14)$$

The objective of this lens is to compensate for range not attenuate the ambient light, though methods of accomplishing this are known in the art. The constraint equation for this is $$\frac{\pi}{4}\left(\frac{rL_{amb}A_D}{(1-m_i)^2\left(\frac{f_i}{D_i}\right)^2}\right)^2 + \frac{\pi}{4}\left(\left(\frac{rL_{amb}A_D}{(1-m_o)^2\left(\frac{f_o}{D_o}\right)^2}\right)^2 - \left(\frac{rL_{amb}A_D}{(1-m_o)^2\left(\frac{f_o}{D_i+2t}\right)^2}\right)^2\right) \equiv \frac{\pi}{4}\left(\frac{rL_{amb}A_D}{(1-m_{eq})^2\left(\frac{f_{eq}}{D_{eq}}\right)^2}\right)^2 \quad (15)$$

where r is the reflectivity, $L_{amb}$ is the ambient light radiance seen by the lens, and it has been assumed that the pixel field-of-view (for each lens) is covered with a consistent reflectivity. Reducing Eq. (15) down gives $$\left(\frac{D_{eq}}{f_{eq}}\right)^2 = \left(\frac{D_i}{f_i}\right)^2 + \left(\frac{D_o}{f_o}\right)^2 - \left(\frac{D_i + 2t}{f_o}\right)^2 \quad (16)$$

Next is to construct design constraints for which there are two. The first is to set the near range return signal equal to that of the furthest range signal. This is the minimum detection level required and implies a peak in between. Making use of the first equation in Eq. (10) and (11) as the near range value and the last equation in Eq. (10) and (11) as the far, the constraint can be developed and is $$\left(\frac{f_i}{z_{near}}\right)^2 \frac{\pi}{4}\left(\frac{\sqrt{A_D}z_{near}}{f_i^2}\right)^2 \equiv \quad (17)$$

$$\left(\frac{f_i}{z_{far}}\right)^2 \frac{\pi}{4}\left(\frac{D_i}{f_i}\right)^2 + \left(\frac{f_o}{z_{far}}\right)^2 \frac{\pi}{4}\left(\left(\frac{D_o}{f_o}\right)^2 - \left(\frac{D_i + 2t}{f_o}\right)^2\right)$$

which further reduces to $$z_{far}^2 \approx \left(\frac{f_i}{\sqrt{A_D}}\right)^2 (D_i^2 + D_o^2 - (D_i + 2t)^2) \quad (18)$$

where $Z_{far} \approx (Z_{far} + f_i - f_o)$. Note is made that in this case the near range values cancel out and have little effect. Knowing what the expected furthest range is to be for a given design requirement determined a priori, Eq. (18) then becomes the first constraint on the design.

The other constraint that can be developed is by setting the range piece wise limits on the domain in Eq. (10) to that of the first domain limit in Eq. (11) or $$\frac{f_i}{\frac{\sqrt{A_D}}{D_i}} = \frac{f_o}{\frac{\sqrt{A_D}}{D_i + 2t}}. \quad (19)$$

The rational for this is as the initial one over range squared return signal role off of the inner lens starts, the ramp up of the outer lens should begin to increase signal—compensating for the impact on the increasingly distant object under study via the active optical system. With some algebra, this constraint equation is reduced to $$2t = \left(\frac{f_i}{f_o} - 1\right)D_i. \quad (20)$$

Thus equipped, we can continue to confirm that our approximations applied during the above design method are valid, and investigate the improvement of some examples of the present invention(s) using this method of design to tune a given lens assembly to be optimized for a range of distances and required radiometric throughputs. In particular our discussion of FIG. 6 will elucidate the goodness of fit in our simplification of the piece-wise exact solution described above in Eq. 7, 8, and 9 vs. their approximate but much clearer prescription for the lens design given in Eq. 10, 11, and 12.

Moreover, through some examples of the compensating lenses taught herein, we can show that the morphology derived from constraining equations such as Eq. 18 and 19 using the non-limiting examples of FIGS. 1, 2 and 3 can provide guidance in how asymptotic behavior is achieved, and at what distance certain compensating radiometric effects are evident.

DETAILED DESCRIPTION OF THE DRAWINGS AND ADDITIONAL EXAMPLES OF USE

The present invention solves the need in active optical systems for instantaneous diversion of received power over a design threshold at close range by a novel compensating collecting optic also known in the art as a receiver-side lens. This compensating lens uses a plurality of optical materials and/or surfaces that vary across the aperture of the lens, reducing the return signal strength at close range but retaining light-gathering power as required at longer distances.

In an example of the present invention as illustrated in FIG. 1, pair of singlet lenses are combined to form a lens assembly in accordance with the compensating lens design. In this example, a stronger outer first lens 101 with a hole or void in its center is combined via a mounting tube 103 with a central inner second lens 104 that has a weaker prescription; that is to say, the inner "front" or second lens 104 has a larger f/# or more light-bending power than the outer "rear" or first lens 101, which has a relatively smaller f/# and less light-bending power. In this context, the concept of f/# is used to describe the image-space cone of light for an object at infinity, and is the ratio of the effective focal length to the diameter of the entrance pupil; an excellent description and illustration of the use of f/#'s can also be found in the Field Guide to Geometrical Optics previously cited but on page 29. To clarify further, a lens with a stronger prescription bends light rays more, and has a higher power with a shorter focal length. A central optical axis is illustrated in the ray bundle 105 in the center of the lens assembly; the radial extent of the lenses 101 and 104 can be measured from a direction normal to the optical axis of the lens assembly as shown in the center ray of 105.

The focal points of the outer first and inner second lenses are coincident when the input light rays 105 are collimated or enter effectively from infinite range. Thus, incident light 105 is refracted by either the first lens 101 or second lens 104 in parallel; although the mounting tube 103 as illustrated does restrict some ray paths it is present predominantly for mechanical mounting reasons as a mounting member; alternative mounting members can juxtapose the lenses so they are correctly spaced yet coaxial along the optical axis are possible, such as spiders, mounting windows with minimal optical power, adhesives or molded mounting structures, or other mounting techniques well known in the art. Light entering the lens assembly of FIG. 1 is thus focused by the inner and outer lenses, 104 and 101 respectively, to different degrees onto the detector plane 102 depending on the range from the object reflecting that light back to the receiving side of the active optical system, with the two lens elements 101 and 104 of the compensating lens assembly acting in concert as the collecting optic for that returned signal. Also of note is that in this illustration the shading of the two lenses 101 and 104 differ; this is to indicate that in at least one example the two singlet lenses might be manufactured from different materials, such as different glasses, polymers, or semiconductors depending on their transmission characteristics at the designated wavelength of use for the system.

In this and other examples to follow, it is assumed that the returned signal from the source behaves as an isotropic Lambertian surface, that is the radiance is constant, and the intensity of the returned signal falls off with the apparent source size or projected area. Radiance is defined as commonly used in the art, that is power per unit projected area per unit of solid angle subtended by the receiver optic; in this case the receiver optic is the compensating lens as depicted in FIG. 1. When the object is closer than infinity, the incoming light will be, on average between the inner 104 and outer 101 lenses, defocused by a controlled amount thus reducing the power density impinging on the detector surface 102. It is this selective defocus of the ray bundle 105 vs. aperture position that provides for signal strength management across a wide range of distances from an object of interest (e.g. target) with a fixed entrance aperture.

Turning to FIG. 2 as yet another example, we see an additional illustration of the cross-section of the lens in line with the example described in the earlier discussion of FIG. 1. Of particular import in this diagram is the illustration of how the solid angle 205 protracted from the detector surface 202 backwards into object space, thus representing the cone of light 206 that might impinge on an optically active surface such as a detector 202. Here the Lambertian reflective object is closer than the distal example of FIG. 1, and thus the faster outer first lens 201 provides a different concentration to the detector surface 202. As in FIG. 1 there is a zone 207 within the first outer lens 201 where the optical power of the lens if it were a simple singlet without having such a region 207 formed such that the optical power of the curved surfaces of the lens 201 does not interact with any light-bending optical power that would normally be there. Several ways to create the region 207 can be imagined, such as casting or manufacturing the lens 201 with a hole or void, figuring the lens so the region 207 is optically flat, or compensating for the curvature that would have optical power in that region 207 in some other way, such as by inducing an index gradient that nulls out the curvature otherwise in the first outer lens' FIG. 201. Thus, combining the two lenses 201 and 204 held in juxtaposition by some mounting member 203 allows a proportional level of defocus to create a more moderate level of surface irradiance at the sensitive medium 202, like an optically active medium or a light guiding member that might conduct the impinging radiation to a distal destination.

For example, the present invention is compatible with coupling the radiometric corrective lens directly to sensors 202, but also to light-coupling materials and structures well known in the art. Examples of such devices include but are not limited to planar light-guide circuits, fiber-launching techniques, and coherent and incoherent light-guiding conduits. Further examples of detectors for light that might generate a signal directly on the detector 202 can include photodiodes, avalanche diodes, a CMOS camera array, a CCD camera array, a microbolometer, a photomultiplier tube, and a Schottky diode. In general such detectors use a physical process to convert light in contact with a detector surface to generate some form of electrical signal that can then be used in combination with signal processing to determine a useful quality of the light returning from the target object.

We now turn our attention to some additional characteristics lenses employed in the construction of a lens assembly such as illustrated in FIG. 2 might have in order to further enhance the operation of the lens assembly in operation, particularly as a range finder and/or LiDAR system with additional signal processor(s.) For example, in order to provide for optimal signal return by the detector, it may be desired to provide some coating or filter to the surfaces of the lenses 201 and 204 to block unwanted or stray light outside the band emitted by an optical source used in a range-finding or LiDAR context. These signals may be used in range finding using schemes such as time-of-flight measurement such as from a chopped or pulsed source of light illuminating the target object; another type of range and velocity finding scheme might employ laser-based Doppler velocimetry. For example, if only the light from an illuminating laser is desired to reach the detector after reflection from a Lambertian-like target object, a coating could be applied forming a thin film narrowband coating passing only the laser wavelength, and thus cutting out stray or ambient light. In this manner, only the designated wavelength(s) of illumination would have an opportunity to traverse the lens assembly and impinge on the detector, generating a signal useful for finding a range or imaging a scene containing that object. Additionally, coatings might be applied to the lens' surfaces 201 and 204 for other later manufacturing steps, such applying anti-reflective surface coatings (AR-coatings,) protective coatings of polymers or dielectrics, or partially reflective metal coatings to reflect unwanted light from further transit of the lenses making up the lens assembly.

Describing FIG. 3, we see a case where the optically-active detector 307 or light-conducting member as described above is now moved to an off-axis case in measuring the input light rays 305. Again, we have a first outer lens 301 juxtaposed in a desired geometry relative to the optical axis by a mounting member 303 from a second inner lens 304 which each have their own cones of accepted light rays from infinity 306 and 302 respectively. Although the on-axis performance is curtailed with a modest amount of asymmetry to the coaxial lens design, what is of note is that the detector regardless of axial mis-positioning, is in fact still seeing the intrinsic benefit of the controlled gradational defocus of the range-compensating lens thus described in this disclosure. More importantly, the inventor calls attention to the fact that since the defocus is tuned to the range, even in a case where error-stacking or mechanical tolerances in mounting elements may be sub-optimal; the intended result is still evident. As a lens axially mis-aligned from the intended focal plane or launch position into a light guide may be degraded, the intended and as-designed rate of defocus vs. range will continue to hold as predicted in first-order radiometric transfer theory. One of ordinary skill in the art would be aware that radiometric transfer is largely, governed by first order geometric ray-optic principles as handled in Gaussian ray optics within this disclosure.

In viewing FIG. 3 we also see a case in which an example might be designed purposefully as a non-imaging or anidolic optical systems, using principles of maximum radiometric throughput to maximize the cone of accepted light rays 305 in solid angle for the first outer lens 301 in sum with those other rays of light 302 captured by second inner lens 304 without consideration of blur or other imaging criteria. Such designs are typified by the application of the edge-ray principle of non-imaging optics as are known in the art. In this method of design, the iteration of lens power, collecting area, relative position of each lens, and range of object distances is performed to maximize radiometric throughput from the target object on the detector 307. It is not necessary in this one example that an image of the object be formed on the detector 307 by either the first lens 301 or second lens 304.

In this on-axis and off-axis case of the present invention, it is shown that the constraints can be relied on in Eq. 19 and 20, such that:

$$\frac{f_i}{\frac{\sqrt{A_D}}{D_i}} = \frac{f_o}{\frac{\sqrt{A_D}}{D_i + 2t}}. \tag{19}$$

and further restated:

$$2t = \left(\frac{f_i}{f_o} - 1\right)D_i. \tag{20}$$

Simply put, as the radiometric throughput to the detector is maximized from already from the inner lens in this example, and the increase in flux captured at the detector from the outer lens should then increase thus providing compensation. This is a principle of the inventions thus described herein.

The importance of these two equations in the design process is part of this disclosure and of particular note. In this case, using the aforementioned approximations where the $A\Omega$ product scaled by the ratio of target and range thus yielding an increase in energy due to an increased solid angle $\Omega$ as the inner lens sees more irradiance than the outer lens. This still results in the intended result of the present invention; a controlled defocus that does not swamp the detector or light-bearing member carrying energy to said detector by controlled zones of defocus in the ray bundle.

Figure 4:
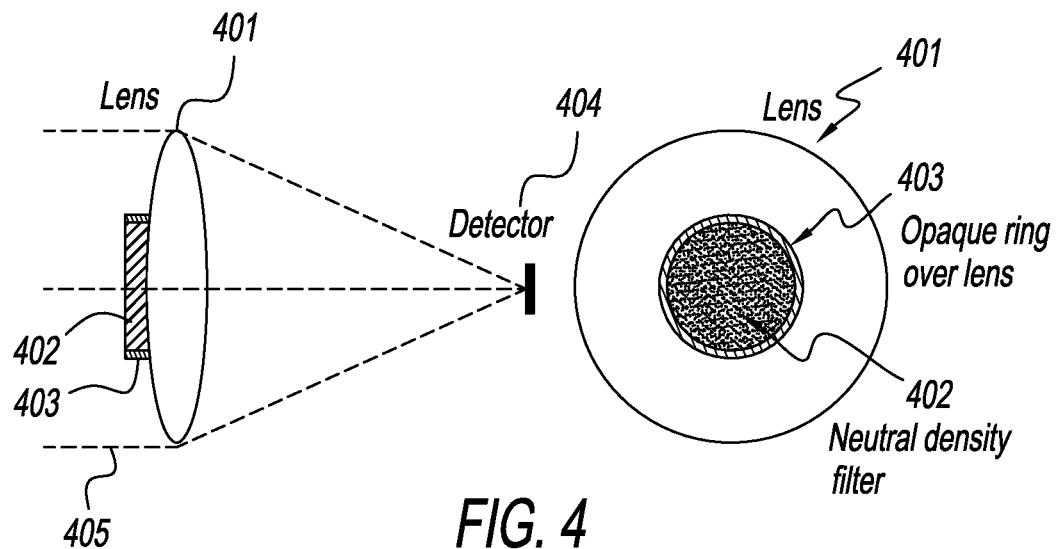
FIG. 4 is a cross sectional and on-axis view of an example of the lens wherein a controlled application of neutral density filters is applied to achieve a similar effect as to the lens illustrated in FIGS. 1, 2, & 3.

Thus far we have focused on the use of refraction or potentially in equivalent systems reflection to achieve a range-dependent compensation for reflected energy from a Lambertian object of interest. Turning to FIG. 4, we find an absorptive and different modality of the present invention, where the light-bending power of the second lens 402 might be allowed to approach zero, and the mounting member contracting from a tube to a ring, potentially of an opaque adhesive 403 that affixes the second lens 402 to the first lens 401. Here, the objective of the compensating lens is to use the complex part of the refractive index at a wavelength of interest (e.g. the absorptive quality of a material) to produce a similar but slightly different range-compensating effect.

In FIG. 4, we see a lens with an opaque ring 403 that is poised in front of a simple lens 401. It would of course be obvious to one or ordinary skill that this simple lens 401 might in fact be a doublet or triplet lens, an aspheric lens, or another sort of lens such as a GRIN lens, with varying other optical qualities including Abbe numbers, dispersions, indices, optical coatings as previously describes, and other optomechanical qualities such as hardness, resistance to acids, fluids, or ionizing radiation. Such optical qualities may vary over the entirety of the aperture, and may be axially symmetric or asymmetric depending on the design criterion.

This present example shows a neutral density filter 402 placed strategically over what is here illustrated as a simple lens 401; in essence, the iterative component of the design methodology has contracted the optical power of the second lens until it is negligible, instead compensating for the difference in throughout from the smallest closest range to the farthest greatest range using another characteristic of the second lens 402, it's absorption. Again, the skilled artisan would note that the ring 403 is potentially a mounting surface serving to rigidize the position of the ND filter playing the part of the second lens 402 vs. the optical surface and design of the lens 401 in FIG. 4. Although an absorber is not necessarily an optical lens in the ray-bending context, radiometric computations show it functions similarly. Of particular import is that a clever designer might combine a plurality of absorptive, reflective, diffractive, or refractive properties to generate a range compensating lens in lines with the teachings of the present invention. For example, the absorptive element 402 illustrated in FIG. 4 as an "ND filter" might actually be a region of slightly more or less absorptive glass within a singlet or multi-element lens 401, and achieve the same range compensating effect in managing the irradiance of the light that strikes the detector 404 or light-bearing element that carries the input irradiance to its eventual point of detection within the system.

Figure 5:
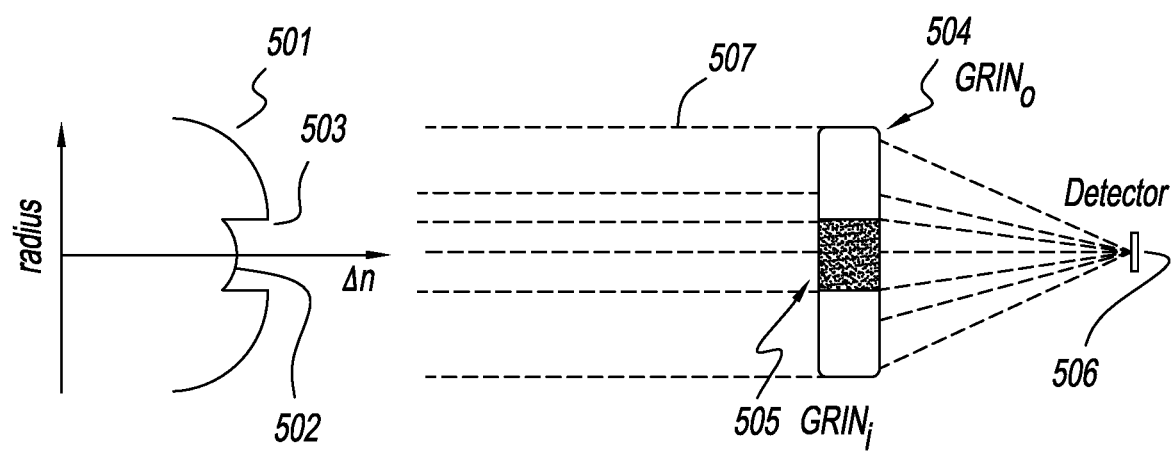
FIG. 5 is a cross sectional view of an example of the lens where gradient index lenses are combined to form a range-compensated lens, and a plot of the gradient index vs. radial distance from the axis showing the coaxial gradient lens combination and discontinuity where two or more gradient index materials would be juxtaposed.

FIG. 5 illustrates a particularly interesting example of the present invention, in that the lenses 504 and 505 are gradient-index lenses. In gradient index ("GRIN") lenses the curvature of the marginal and chief rays in the diagrams earlier evinced are produced by microscopic changes in the structure of the light-carrying material itself, often by ionic or chemical doping to generate a structure of high and low index profiles. These changes in index Δn vary axially, in this case in a radially symmetrical profile as shown for each of two GRIN lenses 504 and 505 having different index differences with radius from the optical axis 501 and 502 respectively. Here, the difference between the first and second lens is bounded by a discontinuity in the index gradient 503, analogous to the contact-based mounting member 403 of FIG. 4, or of mounting members 103, 203, and 303 as shown in FIGS. 1, 2, and 3 respectively. As shown in the art, for example in "Method of producing a refractive index gradient in glass" by J. R. Hensler (U.S. Pat. No. 3,873,408, 1975,) complex ionic gradients can be implanted thus creating a pattern of refractive index that varies axially. This produces, by Fermat's Theorem, the equivalent of a lens earlier illustrated in FIGS. 1, 2, and 3 where the thickness of the material is varied, only in GRIN lenses the index is rather varied.

To further explain FIG. 5 we see to the right a pair of curves 501 and 502 representing the index of refraction of the GRIN surface vs. a radial position referenced to the optical axis. Particular care is taken to call out the discontinuity 503 illustrated on the index of refraction plot on the right (e.g. Δn vs. r) where two different GRIN lenses are in close proximity, and may be adhered to each other if formed separately. This discontinuity 503 is no different in function than the different optical powers of the simple lenses 101 and 104 illustrated in FIG. 1, save that the optical power thus provided is generated by a gradient index vs a difference in curvature or bulk index.

Of a similar but decidedly more modern descent is the concept of constructing a range-compensating lens using metamaterials. Metamaterials, especially so-called "double negative" materials, have unique properties created by man and not found in nature. An excellent example of them is Pendry's "Perfect Lens," described in Phys. Rev. Lett. 85, 3966—Published 30 Oct. 2000 which is incorporated herein by reference. Such a material has at a design wavelength and effectively negative index of refraction, thus having varying degrees of light-bending ability depending on how the material itself was engineered. By juxtaposing two annuli or rings or arrays of such a material as shown in 504 and 505, it becomes easy to design at a wavelength compatible with the metamaterial a range-compensating lens in the disclosure provided herein. Indeed, any plurality of light-modulating or transforming materials can be geometrically aligned to generate the effect illustrated in the radiometric range compensating lens. In the case of metamaterials, the millimeter wavelengths are particularly enhanced as candidates for range-compensation via the proposed inventions.

Finally, it is worth noting that in materials where complex indices of refraction are non-isotropic nor radially symmetric, polarimetric effects such as birefringence might be made of design value. For example, a simple variation in index radially encoded could generate an optical vortex later launched into a polarization maintaining fiber. Rather than simply reject the bulk irradiance from the detector 506, a portion of the detector 506 might itself be selective to detecting given polarization states. Such sensors are well known in the art, an example of which can be found in the PolarCam™ and its internal sensors as manufactured by 4D Technology. There a single detector substrate is overlaid with a polarization sensitive mask, thus making each quadrant of the detector 506 a microscopic polarimeter. One of ordinary skill in the art would see that arrays of these detectors, each managed by a range-compensating lens, would be a potent tool in sensing not only impinging irradiance but also its polarization state.

Armed with both a series of exemplary designs showing the degrees of freedom in crafting the lens assemblies, as well as the range finding systems they enable, we now turn in general to both a manual and machine-assisted method of designing lens assemblies for systems in the spirit of the disclosure provided. In designing the lens assemblies, we begin by determining for a given detector a specified range of input irradiances from a target object, often reflected from an active source. Such a source in an active optical system might include one or more of: a laser with a designated wavelength, an LED of a designated wavelength band, an arc lamp, an incandescent lamp, or in the case of mm-wave optics a gyrotron or driven avalanche diode structure. Also, a range of potential object distances from the lens assembly gathering the reflected light from the target object, bounded by an outer far range, and an inner close range, are determined as well. Although two lenses are illustrated previously, a plurality of lenses can be combined in the spirit of the disclosure with the design process applied to iterate through computing parameters for each lens: a potential optical power for each lens, a possible value for its effective collecting area, its relative position along an optical axis for the lens assembly, and thus the input irradiance on the detector from that one lens in the plurality of lenses in the assembly. The sum of the outputs of these lenses in the assembly irradiates the detector, thus generating some signal to be used for example in a range finding system as previously discussed. Depending on the other design constraints such as weight, cost, dimensions of the overall system, wavelength(s) of interest for the target object, and environmental concerns in the medium surrounding the lens assembly and target object, changes are made to the various lens parameters using the observed progress from one iteration to the next until a suitable design for the lens assembly is found.

In the interest of executing this design method expediently, it may be performed iteratively within the context of a processor coupled to a computer memory that holds machine code for performing the lens assembly calculations, and for iterating in an orderly fashion within the lens parameters and the overall desired specification for the assembly in context of the system it will enable. Although such iteration can be performed in part in a computer, it need not be necessarily so. Specialized processors performing the iterative calculations as hardware instructions can be applied to perform the iterative steps of the design. Although it is often helpful to use computers in this fashion, and optimization algorithms for iterating rapidly through a series of design variables to arrive at a workable set of lens parameters for each element within the lens assembly and larger range finding system, we can now show that applying the approximations illustrated above such is not necessarily the case providing judicious application of the teachings in this disclosure are followed.

Figure 6:
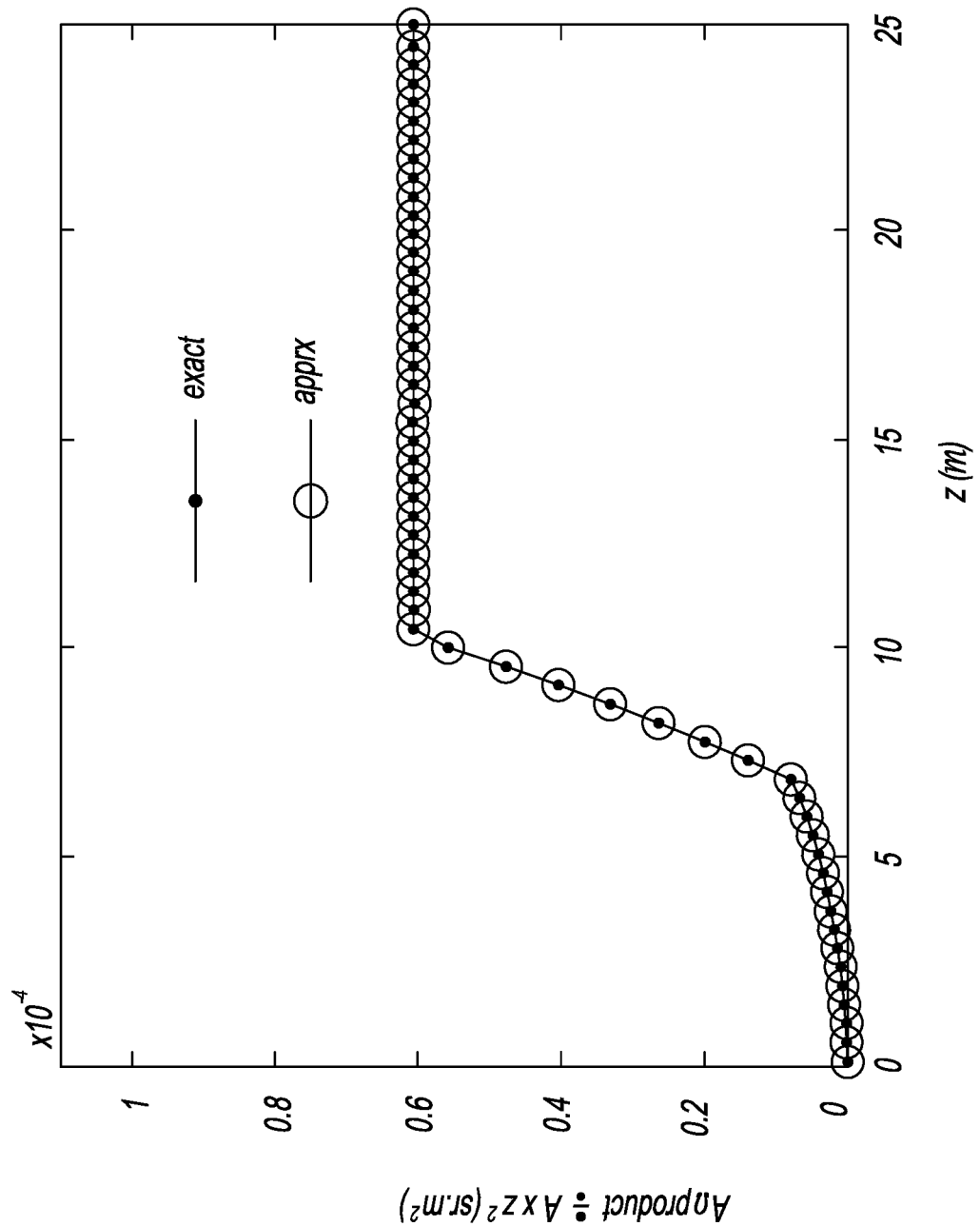
FIG. 6 is a plot showing agreement between of the exact solution of the $A\Omega$ product relative to the target area, and the approximation presented in Eq. 12 of the design method.

FIG. 6 illustrates a design method utilized throughout the prior examples and shows the rigor of the simplifications provided in the treatment provided herein. A central and paramount quality of the design method is understanding via radiometric transfer how the compensating lens behaves over a wide range of design variables, especially those of $f_i$, $f_o$, $D_i$, $D_o$, t, and $\sqrt{A_D}$ where the variables refer to the inner focal distance of the central lens in the illustrative examples of FIGS. 1, 2 and 3, the outer focal length of the outer annular lens in the same said figures, the diameter of the inner and outer lenses, respectively, their spacing, and the characteristic dimension of the detection as is known in the optoelectronic arts. Here we test the approximations relied on in Eq. 19 and 20, as they are used in some illustrative designs herein.

There are a great many design variables in the correctly attuned range-compensating lens. In this figure we show that our simplification of them holds true over a variety of ranges and conditions. This disclosure further teaches that in the most stressed condition the target is often at infinity; range compensation in the present invention is often the art of not saturating or destroying a detector at closer ranges with higher signal levels at the detector or the light-bearing member that conducts the irradiance to its eventual sensor.

Core to the illustrations further shown as examples in FIGS. 7, 8, 9, 10, & 11 is the approximation graphed in FIG. 6 and based on Eq. 10-12 herein. We recall here that a core need met by the present invention is that $\Omega(z)$ should be as constant as possible over z (range.) To accomplish this quickly, and further provide a rapid method of designing the range-compensating lenses of the present invention, it is vital that the design parameters simplified in Eq. 10-12 can be validated over the complete and exact forms of Eq. 7, 8 and 9. More importantly, we call attention to design assumptions made earlier, that the range is much greater than either lenses focal length in our simple lens examples as illustrated earlier in FIGS. 1, 2 & 3, e.g. $z \gg f_i$ and $z \gg f_o$. In this plot we see that over a range from zero to 25 m the approximation vs. the exact and cumbersome solution are equal. Thus, we can move on to each of our example range-compensating lens assembly designs for further study in appreciation of the present invention. It is further noted that in general in telemetric applications the effective focal length of the system is rarely on the order of the range to the object of interest.

Figure 7:
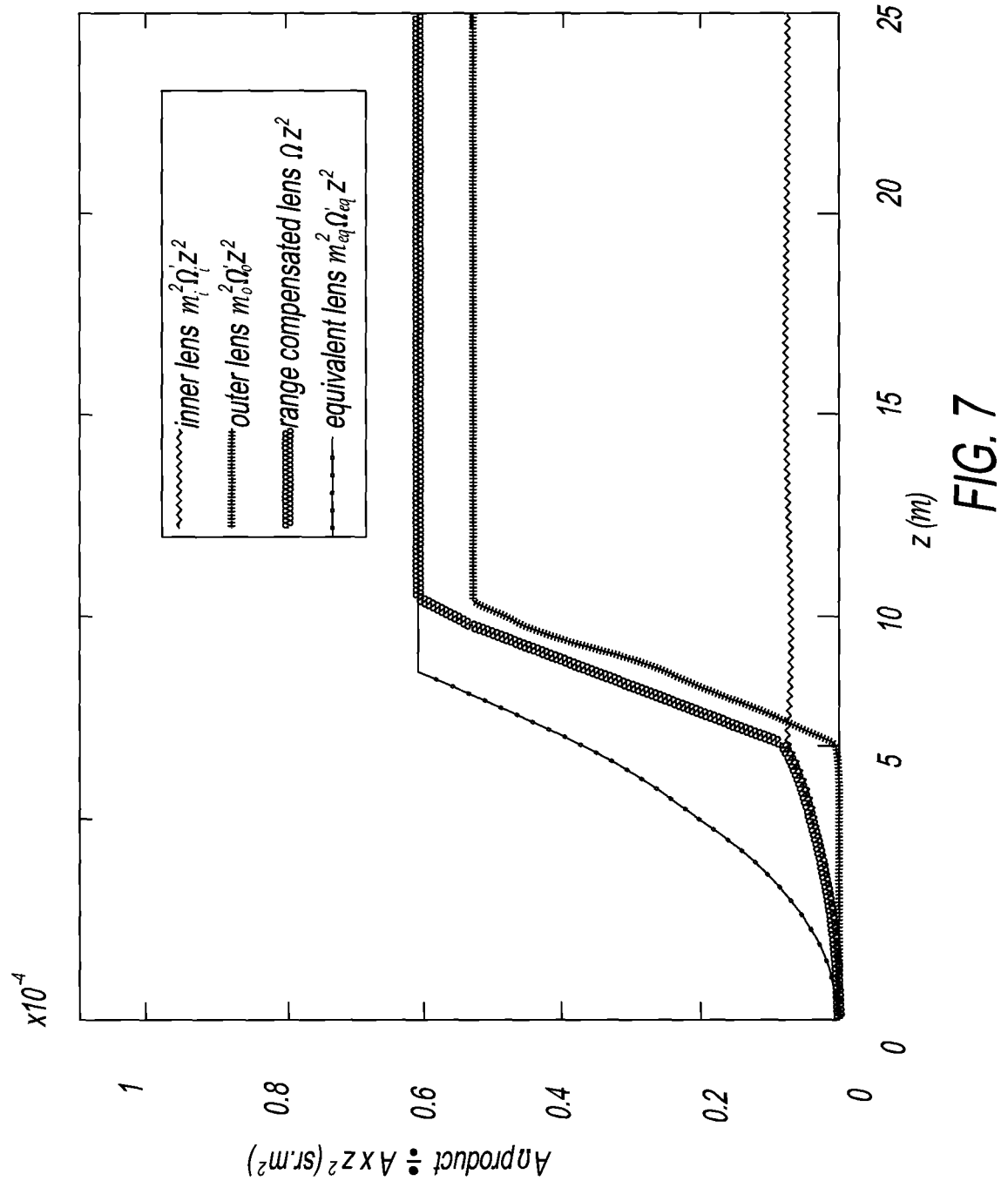
FIG. 7 is a plot showing the radiometric performance of the individual lenses in the short-range two simple lens example, the equivalent simple lens, and the range compensating lens over a range of 0-25 meters.

In FIG. 7, we see the actual performance radiometrically of an example of the invention herein disclosed. In this short-range design using a small optical assembly the inner lens has an $f_i$=33 mm, $D_i$=3.1 mm, $f_o$=14 mm, $D_o$=11 mm, and t=2.1 mm. The characteristic dimension of the detector is 15 μm. We note that this small compact optical configuration would be particularly interesting in mobile devices, such as tablets, miniature sensor systems for vehicular or recreational applications, or mobile phones.

Illustrated in FIG. 7 are the radiometric products of each element of the simple lens system used to illustrate the invention in but not limited to FIGS. 1, 2, & 3. Two simple lenses can be combined using Gaussian optics into a single equivalent simple lens, as illustrated in the dotted line of the graph here described. When the target is close in range, the compensating lens only gathers light using the innermost lens. Where we do note here that two coaxial lenses are present, more than two lenses could surely be employed, as additional degrees of freedom are required in the ultimate design. At approximately 6 m the outer lens begins to collect light, ultimately focusing it on the detector of the system as described above. Moreover, the applicant calls attention to the clear difference between the Gaussian equivalent lens that generates a maximum product at 8 meters, while the range-compensated lens does not reach a peak in throughput until over 10 m. Given the minute size of the device in question, this differential is significant. There is simply no equivalent simple lens, however devised out of other systems of lenses, that can provide this range-compensation quality.

Figure 8:
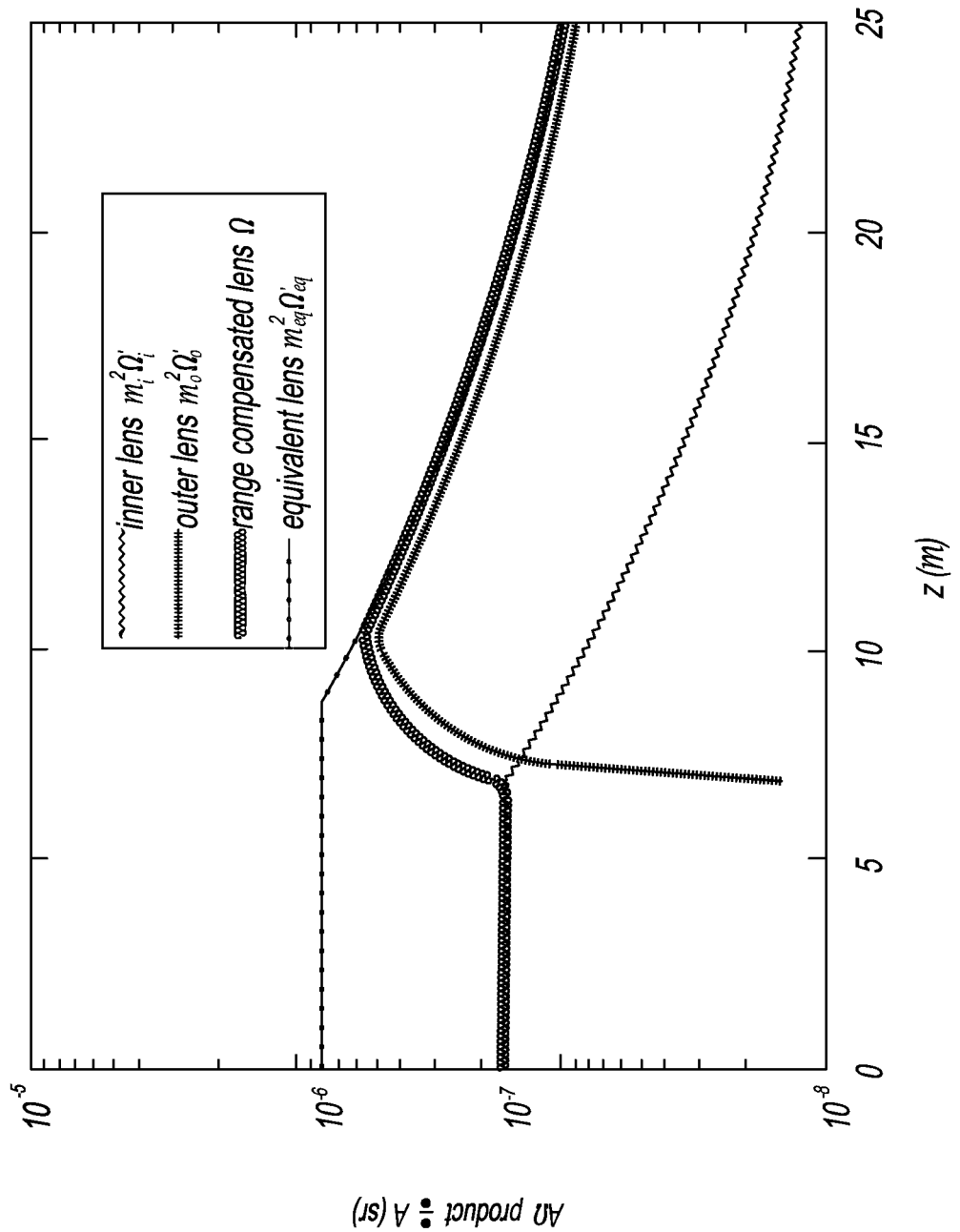
FIG. 8 is a plot demonstrating the regulative effect of the short-range compensating lens in the two simple lens example compared to either lens alone or an equivalent combination simple lens over a range of 0-25 meters.

To further clarify the aim of the present invention, FIG. 8 shows the ultimate result of using either a. the inner lens alone, b. the outer lens alone, c. a Gaussian reduction of the two (e.g. yet a different singlet lens) or d. the range-compensating lens of the present invention. Here the design parameters are the same as described earlier in the discussion of FIG. 7.

Figure 10:
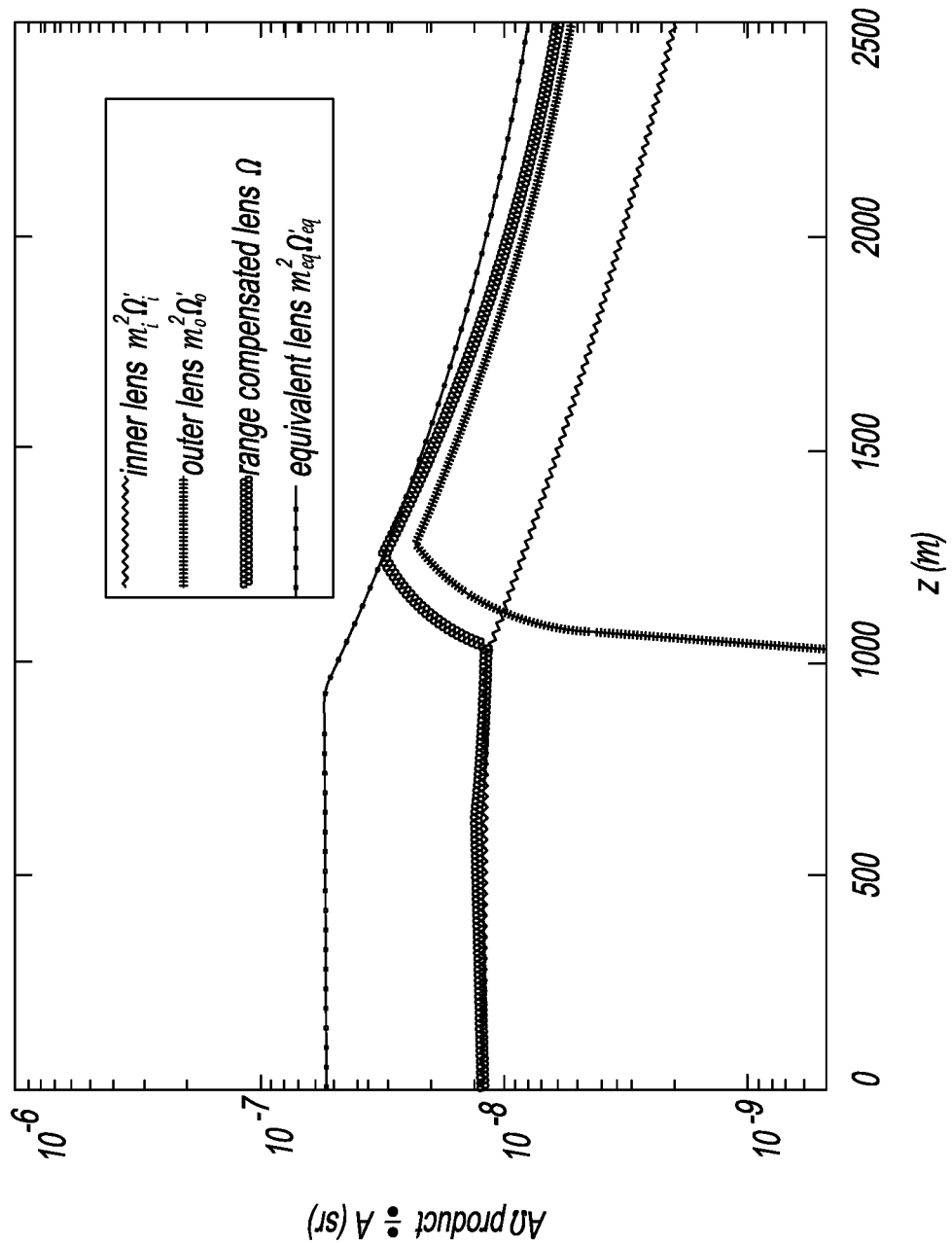
FIG. 10 is a plot demonstrating the regulative effect of the long-range compensating lens in the two simple lens example compared to either lens alone or an equivalent combination simple lens over a range of 0-2500 meters.
Figure 11:
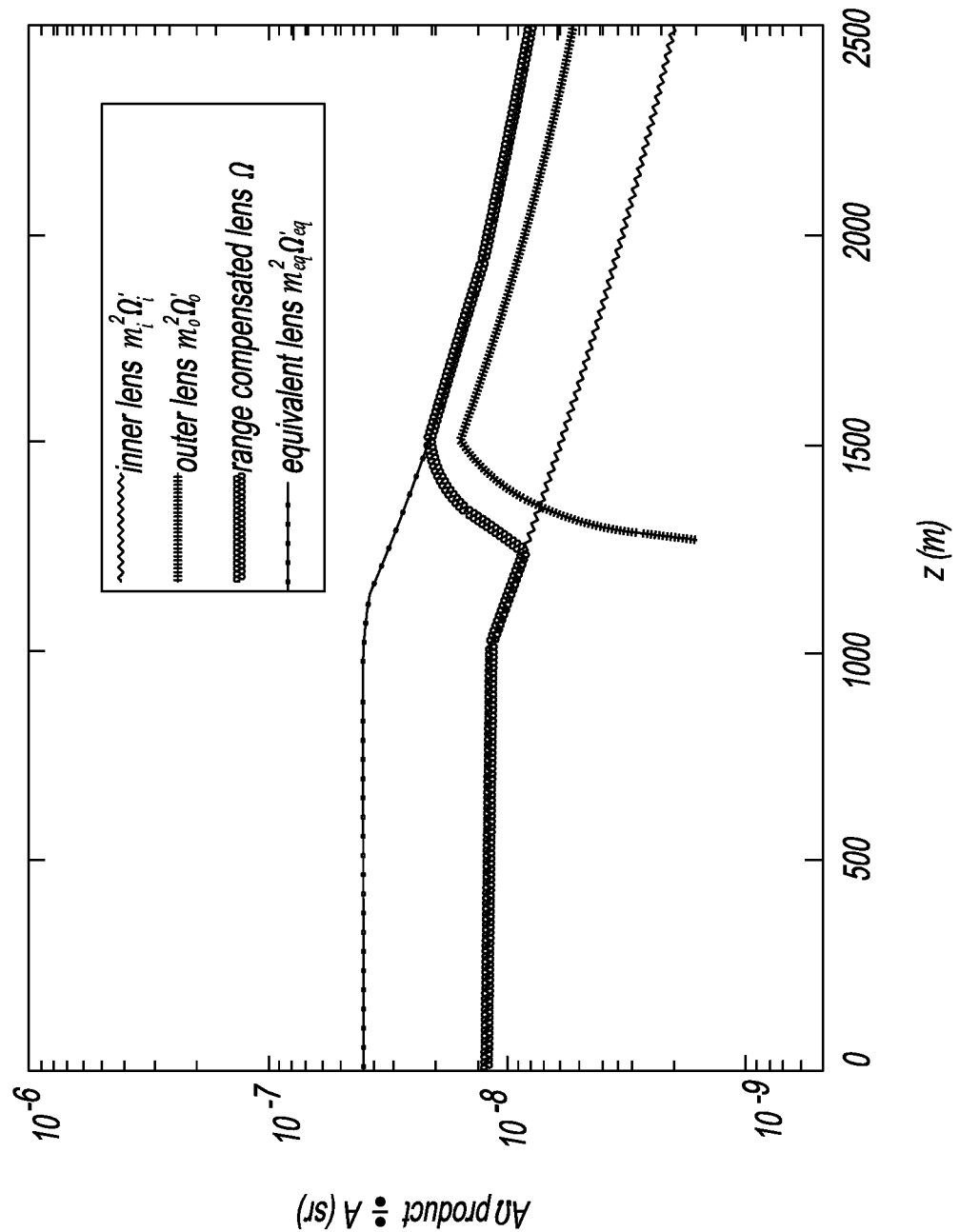
FIG. 11 is a plot illustrating the shift in the discontinuity in radiometric performance that can be achieved by altering the design of FIG. 9 and FIG. 10 to loosen the constraints of EQ. 19 to improve compensation in a long distance regime especially as shown near 1600 m.

The key metric in this illustration and FIGS. 8, 10, and 11 is how monotonic the $A\Omega$ product is vs. range in meters. Simply put, a flatter more horizontal curve represents a more range-compensated solution in line with the description of the invention as earlier described. The aim is not simply to have the most signal, it is to have the best managed signal over a wide scope of ranges. As the curves of FIG. 8 illustrate, the equivalent lens in the very shortrange condition generates an order of magnitude more energy on the detector, and predictably falling off with increasing z in meters. Here in particular the counterbalance effect of the inner and outer lenses, working together, is easily seen; the range-compensated lens performs better over the entire range regime than either the inner, outer, or Gaussian reduction equivalent lens. The range compensated lens provides detector protection at shorter distances, while managing to provide a more horizontal uniform presentation of the light cone collected to the detector than options a. b. or c described earlier. The range compensating lens is more uniform in the energy delivered to a sensor or an optical coupler to a sensor in this design regardless of distance, where the inner, outer, or equivalent lens would at short ranges oversaturate or at longer ranges simply not perform at all. Again, the aim of the present invention is to compensate for range differences radiometrically, not optimize per se for a given range and radiometric condition.

Also of particular note in studying the morphology of the $A\Omega$ product as a function of z is the presence of a 'bump' or discontinuity prior to the peak of said product, in the case of FIG. 8 at a range of 10 m. Where and how marked this discontinuity in the $A\Omega$ product occurs is itself a design consideration, and one that would not be easily predicted using the exact solutions found in Eq. 7, 8, and 9 but are easier to predict for a given compensating lens configuration from the approximate solutions relied on in this plot. From FIGS. 8 and 10, the plots show a bump leading to a peak in the range-compensating lens assembly. This indicates that the light directed from the inside of the outer lens contacts the detector too early in range for a smooth compensation. This could be reduced by loosening the second constraint described in the design methodology, mainly the constraint described in Eq. 19 earlier in this disclosure. The left side of Eq. 19 could have an added quantity that would push the bump out thereby reducing the peak but producing an undesired valley. This can also have the effect of increasing the volume indicating there is a potential trade to be made. If we change the outer lens focal length to 0.6 m from 0.5 m, the bump is pushed out to roughly 1600 m as expected and as shown in FIG. 8. The focal length was chosen to place the peak exactly between the start of the one over range squared loss and the set end range. This reduces the peak value smoothing out the curve over the ranges domain but has an added dip at 1200 m (the near and end points are no longer the minimum values). Unfortunately, at short ranges there is only a factor of three difference in the AΩ product divided by A from the effective lens which is less than the long range design at slightly more than five. Also, noteworthy is the physical volume of this new lens has grown by 32% to 0.0308 m$^3$. Clearly as the outer lens' focal length is increased closer to that of the inner lens—the range compensating lens converges to a simple lens mathematically.

Figure 9:
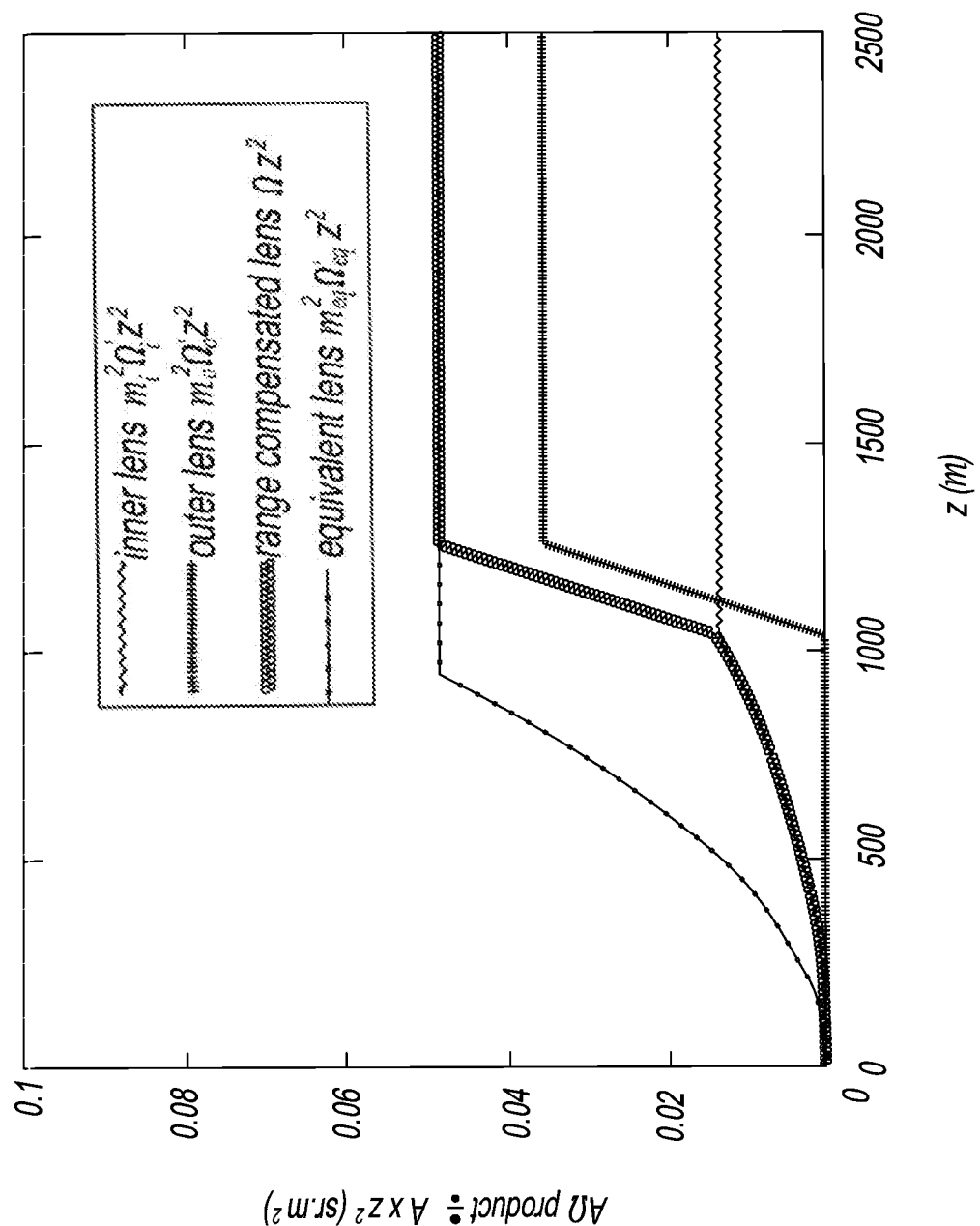
FIG. 9 is a plot showing the radiometric performance of the individual lenses in the long-range two simple lens example, the equivalent simple lens, and the range compensating lens over a range of 0-2500 meters.

Turning to FIG. 9, we see a similar illustrative example as illustrated in FIG. 7, only here we explore a long-range sensor system with a compensating lens. Specifically, in this long-range example we have system parameters different than FIGS. 7 and 8, in that $f_i$=1.2 m, $D_i$=0.13 m, $f_o$=0.6 m, $D_o$=0.375 m, and t=90 mm with a detector characteristic dimension of $\sqrt{A_D}$=150 μm. Here we imagine a range finding system that would be designed to operate at ranges as long as 2000 m, and perhaps at a long wavelength. Again, we see behavior similar to FIG. 7 discussed earlier. The geometry of this simple lens illustrative example is similar to that shown in FIG. 1 though is not limited to only singlet or simple lens equivalent. For example, one of skill in the art would recognize that depending on the light source used in active optical system corrections for chromaticity or polarimetry might be required as well in the optical elements used to compose the range-compensating lens described herein. Where the combined elements perform differently is clearly seen in their separation and inflections between 500 and 1300 meters.

Illustrated in FIG. 10, again we see the radiometric correction of the lens described in the present invention. Even more than in the short-ranged examples, the extrema of the inner, outer, and equivalent lenses are clear in comparison to the compensated lens. As the plot shown in both FIG. 8 and FIG. 10 are logarithmic, it is easy to see that the compensation of the lens design in the present invention creates a more uniform radiometric optical receiver over a wide range of distances to a reflector, in this case over 3 orders of magnitude. Moreover, as illustrated in this radiometric comparison between the other possible lenses or combinations of lenses we see a more monotonic smooth curve over a wider range of ranges. Thus, the lens itself through multiple areas across an aperture of elements self-regulates the high and low returns of signal vs. range through meters to thousands of meters. Again, care is taken to point out the 'bump' and asymptotic behavior as was discussed earlier in FIG. 8 above of the present disclosure. In both cases the discontinuous point seen in the graph of the compensating behavior of the lens example illustrated here could be adjusted further outward in distance by adding some value to the left side of the constraint described in Eq. 19 as desired to meet a priori design specifications.

FIG. 11 illustrates a further iteration of the design presented in FIG. 10, where the discontinuity and "bump" in radiometric compensation for range vs. range is purposefully shifted to a greater distance, in this case to approximately 1600 m from 1250 m by relaxing the equivalency expressed in Eq. 19 and allowing for some weighting to the left side of that equation to change compensation performance at greater distance. In allowing a change in the outer focal length from 0.5 to 0.6 m, the peak throughput is now reduced at the "bump" near 1250 m in the example of FIGS. 9 and 10, allowing for a smoother curve of radiometric performance overall, but generating an added dip near 1200 m. This is an exemplary form of an a priori design decision as referenced in earlier parts of this disclosure; short range compensation is only a factor of 3 from the original compensating lens in FIGS. 9 and 10, which has short range compensation of a factor of 5 both compared with their respective equivalent lenses. In exchange, overall moderation of the one-over-range falloff in radiometric performance is improved at larger distances. In relaxing the criterion that the initial one-over-range-squared distance can begin before or after the outer lens begins to gather signal, it is possible to modify the compensation effect, and at what range compensation begins to truly occur as part of the design process. Here, compensation for intermediate ranges are favored over shorter distances while maintaining performance and well-behaved functional form of the AΩ product at even longer distances. Relaxing the absolute equivalency in Eq. 19 allows the designer to pick up a degree of freedom in optimizing the design for a given regime of ranges.

Figure 12:
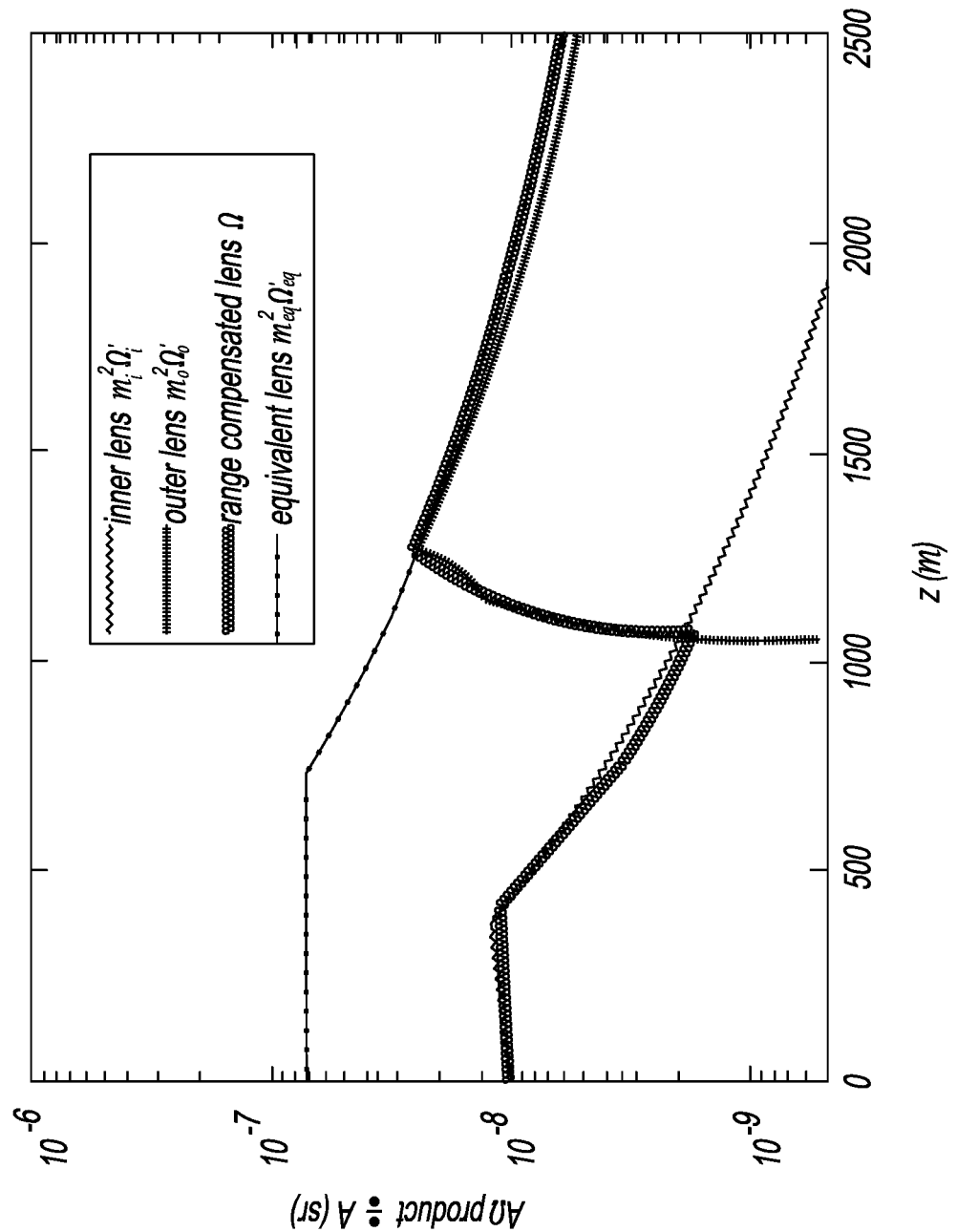
FIG. 12 is a plot demonstrating the regulative effect of an alternative long-range compensating lens in the example using a central neutral density filter over a range of 0-2500 meters.

FIG. 12 illustrates, akin to that expressed in FIGS. 8 and 10, how the example taught and illustrated with the ND filter in FIG. 4. Here we again look at a long-range design example, only using a neutral density filter instead of a differently focusing central lens as illustrated for example in FIG. 1. Again, here we look not for simple highs or lows in the curves detailing the radiometric throughput of the designed system, but for how well behaved it is over ranges, e.g. how horizontal and well-behaved the curves are. Although the system illustrated in FIG. 4 is simple, it is shown to also be very effective. When the target object is very close, the lens as illustrated is focused at infinity thus most of the light will fall outside the detector surface, or be absorbed by the ND filter itself. Although an opaque light-blocking ring is illustrated in FIG. 4 it should be obvious to one skilled in the art that such a ring could be made arbitrarily thin, and is used in this example mostly to approximate the optical mounting tube in comparison to FIG. 1. Additionally, it is noted that some earlier constraints such as that found in Eq. 19 become even less pronounced in this example since $f_i = f_o$, and t≠0.

In this example we see that the close-range signal strength is compensated to a factor of 7, while retaining good performance over 1000 m. In this example of an example of the invention, a focal length of 1.2 m, and an ND of OD 0.83 is used as an example. Most importantly this example shows that not only lenses but other optical materials can be fused together to generate an effective solution in line with the current invention. Moreover, rather than discrete absorptive and lens-based elements, a plurality of elements can be combined at times into single physical elements. For example, a series of coatings or treatments might be applied to a singlet, doublet or triplet lens to create in one optical element the multiple optical properties described above to generate an example of the present invention. Indeed, a single piece of material, with multiple properties depending on the entering rays across its aperture, might handle each light-manipulating property in an angularly selective way. Thus, a single piece of glass might contain one or more elements that in the spirit of the present invention perform its novel range-compensating effects.

Finally, in the examples thus far illustrated as well as other examples of the invention enabled by this disclosure other elements of managing optical power in an active optical system are compatible with the range compensating lens. By means of non-limiting example, the active gain control method described in the U.S. Pat. No. 5,198,657 issued to Trost and Lieber, where an active control circuit is used to modulate a detectors gain. Although this system does not offer the instantaneous optical compensation of the present invention, nonetheless it would be augmented by an optical receiver that was used with the range compensating lens assemblies described herein. Moreover, arrays of range compensating lenses could be combined to form arrays of sensors each acting independently and gathering an image where each sensor output is correlated into a depth, thus generating a sort of 3D shape map in the z-plane of the object. Microlenslet arrays of range correcting lenses might be placed near or in contact with an array of detector elements, each of which is used to compensate for the returned signal imaged at that point in the array. In this way the compensating lens assemblies can be multiplexed; moreover such a lenslet array could be launched into an image guide, with the detector array distal to the aperture of the lenslet array as required my mechanical or safety concerns.

Although many examples of the invention have been evinced, it should be obvious to one of skill in the art that elements of the recited examples may be combined in whole or in part to meet the needs of a particular application while still allowing the lens design to be applied to its intended design aim.

While the foregoing written description of the invention enables one of ordinary skill to make and use what is considered presently to be the best mode thereof, those of ordinary skill will understand and appreciate the existence of variations, combinations, and equivalents of the specific example, method, and examples herein. The invention should therefore not be limited by the above described example, method, and examples, but by all examples and methods within the scope and spirit of the invention as claimed.

Having thus explained my invention(s) for Letters Patent, I claim:

1. A lens assembly comprising:
   a. a first lens, having an optical axis and a refractive optical power, and further having a region formed within the first lens capable of allowing light to pass without interaction with the first lens' refractive optical power;
   b. a second lens, having a second optical axis and a second refractive optical power lower than the first lens' refractive optical power; and
   c. a mounting member fixing in space the second lens relative to the region formed of the first lens at a desired spacing both along an optical axis of a lens assembly, and in at least one other position measured from a normal to the optical axis of the lens assembly, where the optical axis of the first lens and the second optical axis of the second lens are coaxial.

2. The lens assembly of claim 1 wherein the first lens or the second lens is one of a gradient-index lens, an achromatic doublet, an achromatic triplet, a Fresnel lens, a diffractive optical element, or an aspheric lens.

3. The lens assembly of claim 1 wherein the first lens or the second lens is a multielement lens.

4. The lens assembly of claim 1 wherein the region formed within the first lens capable of allowing light to pass without interaction with the first lens' refractive optical power comprises a void, a window, or gradient index lens that compensates for at least part of the first lens' refractive optical power.

5. The lens assembly of claim 1 wherein the first lens or the second lens is made of a metamaterial.

6. The lens assembly of claim 1 wherein the first lens or the second lens is coated with at least one of a thin-film optical coating, a diffractive optical structure, a polymer coating, an adhesive coating, or an absorptive coating.

7. The lens assembly of claim 1 further comprising at least one additional lens positioned by an additional mounting member between the region formed within the first lens capable of allowing light to pass without interaction with the first lens' refractive optical power and the second lens.

8. The lens assembly of claim 1 where the lens assembly is further comprises a non-imaging lens assembly.

9. The lens assembly of claim 1 where the mounting member further provides a continuously variable refractive optical power between the first lens and the second lens.

10. A range finding system comprising:
   a. a source of light projected at a target;
   b. a lens assembly having an optical axis, the lens assembly positioned to gather light from the source of light reflected by the target, the lens assembly further comprising:
      i. a first lens, having an optical axis and refractive optical power, and further having a region formed within the first lens capable of allowing light to pass without interaction with the first lens' refractive optical power formed within said first lens;
      ii. a second lens, having a second optical axis and a second refractive optical power lower than the first lens' refractive optical power;
      iii. a mounting member fixing in the second lens within the region formed within the first lens capable of allowing light to pass without interaction with the first lens' refractive optical power of the first lens at a desired spacing both along the optical axis of the lens assembly, and in at least one other position measured from a normal to the optical axis of the lens assembly, where the optical axis of the first lens and the second optical axis of the second lens are coaxial;
   c. a detector positioned so that the lens assembly is between the target and the detector so at least some light passing through the lens assembly illuminates at least part of the detector generating an electrical signal; and
   d. a signal processor connected to the detector that receives at least part of the electrical signal from the detector and computes a range from the lens assembly or detector to the target based in part on that electrical signal.

11. The range finding system of claim 10 wherein the first lens or the second lens is coated with at least one of a thin-film optical coating, a diffractive optical structure, a polymer coating, an adhesive coating, or an absorptive coating.

12. The range finding system of claim 10 where the lens assembly is further comprises a non-imaging lens assembly.

13. The range finding system of claim 10 where the source of light projected at the target further comprises one or more of: a laser, an LED, an arc lamp, an incandescent lamp, a gyrotron, or an avalanche diode.

14. The range finding system of claim 10 where the detector is a CMOS detector array, a CCD detector array, a microbolometer, a photodiode, an avalanche diode, a photomultiplier tube, or a Schottky diode.

15. The range finding system of claim 10 where the signal processor further comprises a computer having processor coupled to a memory for execution of machine code.

16. A method for designing a lens assembly, the lens assembly having an optical axis, comprising:
   a. determining for a detector a specified range of optical irradiances, including a minimum optical irradiance and a maximum optical irradiance, that an optical detector can receive over its light detecting surface at a designated wavelength from a target at an object distance;
   b. determining a specified range of object distances, including a near object distance and a far object distance;
   c. for each lens in a plurality of lenses computing an optical power per lens and selecting a position along the optical axis, each lens having an effective collection area and an optical power, such that the selection of the position along the optical axis and the optical power is responsive to a determination of a sum of optical irradiance collected by the plurality of lenses in combination onto the detector; and
   d. iterating through a selection of optical powers, positions along the optical axis, and effective collection areas for each lens in the plurality of lenses, adjusting the effective collection area and optical power of each in a plurality of lenses until the optical detector receives an amount of irradiance onto its light detecting surface such that over the specified range of object distances the optical detector receives at least the minimum optical irradiance and no more than the maximum optical irradiance over the specified range of object distances.

17. The method for designing a lens assembly of claim 16 where the adjusting of the effective collection area and optical power of each in a plurality of lenses is such that a lens in the plurality of lenses having a collecting area closer to the optical axis has a lower optical power than another lens in the plurality of lenses.

18. The method for designing a lens assembly of claim 16 where the plurality of lenses consists of two lenses and where the lens with a collecting area closer to the optical axis has a lower optical power than the lens with a collecting area farther from the optical axis.

19. The method for designing a lens assembly of claim 16 where the step of iterating over the selection of optical powers, positions along the optical axis, and effective collection areas of a lens in the plurality of lenses is performed by a processor coupled with a computer memory holding machine code.

20. The method for designing a lens assembly of claim 16 where the lens' effective collection area is reduced at the designated wavelength by a filter from a physical collection area.

\* \* \* \* \*